Patented Sept. 12, 1950

2,521,912

UNITED STATES PATENT OFFICE 2,521,912

PHENOL ALDEHYDE POLYEPOXIDE COMPOSITIONS AND REACTION PRODUCTS

Sylvan Owen Greenlee, Louisville, Ky., assignor to Devoe & Raynolds Company, Inc., Louisville, Ky., a corporation of New York No Drawing. Application March 8, 1946, Serial No. 653,156

7 Claims. (Cl. 260—59)

This invention relates to new products and compositions resulting from the reaction of phenol aldehyde condensates with polyepoxides in regulated proportions to give valuable compositions for use in the manufacture of varnishes, molding compositions, adhesives, films, fibers, molded articles, etc. The invention includes initial reaction mixtures or compositions as well as intermediate and final reaction products or compositions and methods for their production and articles and products made therefrom.

According to the present invention, phenol aldehyde condensates in the form of initial or intermediate reaction products are caused to react with polyepoxides to form new complex reaction products. More particularly, the invention relates to the reaction of phenol formaldehyde condensates containing phenollic hydroxyl groups with polyepoxides to form new reaction products.

One of the objects of the invention is the production of compositions containing phenol aldehyde condensates and polyepoxides in proportions suitable for reaction by direct addition without the formation of by-products to form resins, films, molding compositions, etc.

Another object of the invention is the production of intermediate reaction products of phenol aldehyde condensates and polyepoxides which are capable of further reaction to form insoluble, infusible products, and the preparation of higher molecular weight and more complex compositions from such lower molecular weight epoxy compositions.

Another object of the invention is the production of new polyepoxy-polyhydroxy products by the reaction of phenol aldehyde condensates with more than the equivalent proportion of polyepoxides so that each phenolic hydroxyl group reacts with an epoxy group of a polyepoxide to form polyepoxy polyhydroxy compounds free or substantially free from phenolic hydroxyl groups.

Another object of the invention is the production of complex polymeric reaction products of phenol aldehyde condensates and polyepoxides having free terminal epoxide groups and capable of further reaction to form final insoluble, infusible products.

Another object of the invention is the production of films, articles and molded products and other final reaction products of outstanding properties from such polyepoxy combinations.

The phenol aldehyde condensates used for reaction with polyepoxides according to the present invention are products formed by the reaction of phenols and aldehydes, particularly formaldehyde, to form condensation products containing reactive hydroxyl groups. Phenol and formaldehyde, for example, react to form somewhat different reaction products depending upon the proportions and conditions of reaction, and including reaction products such as phenol alcohols having both phenolic and alcoholic hydroxyl groups, and reaction products of the diphenolmethane type containing phenolic hydroxyl groups. In the condensation of phenols and aldehydes, particularly formaldehyde, a variety of intermediate condensation products are produced varying in their properties and nature with different proportions of reagents and different conditions of condensation. The phenol aldehyde resins at an initial or intermediate stage of reaction are included in such phenol aldehyde condensates. The condensation of phenol and formaldehyde can be carried out with the use of either acid or basic condensing agents and in some cases by first combining the aldehyde with a base such as ammonia to form hexamethylenetetramine and reacting it with the phenol to form the phenol aldehyde condensate.

In general, the phenol aldehyde condensates should not have their condensation carried so far that they become insoluble and non-reactive put should be used at an intermediate stage or at a stage of reaction such that they contain reactive phenolic hydroxyl groups or both phenolic and alcoholic hydroxyl groups. Initial and intermediate products such as are made in producing phenol aldehyde resins can be used provided the condensation is carried only to an intermediate stage such that the products can be blended with the polyepoxides and caused to react therewith.

The phenol aldehyde condensates may thus be derived from mononuclear phenols, polynuclear phenols, monohydric phenols or polyhydric phenols so long as the reaction product is miscible with the polyepoxides or so long as they are mutually miscible with the polyepoxides and the solvent which is used as a reaction medium. The phenol aldehyde condensate may be a water soluble type or an alcohol soluble type or an oil soluble type. The phenol aldehyde condensate may also be a heat converting type or it may be a permanently fusible type.

A phenol aldehyde condensate which is essentially a polymethylol phenol and is not a polymer may be used in the preparation of the new phenol aldehyde polyepoxide condensates, or it may be used after further condensation, in which case more or less of the methylol groups are usually considered to have disappeared in the process of condensation.

Various so-called phenolic resins which result from the reaction of phenols and aldehydes are available as commercial products and may be e. g. readily fusible or readily soluble in solvents such that they can be readily admixed with the polyepoxide for reaction therewith to form the final reaction products.

The polyepoxides used for reaction with the phenol aldehyde condensates contain two or more epoxide groups. The simplest diepoxide will contain at least four carbon atoms as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The polyepoxides may also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the desired conversion of the polyepoxide-phenol aldehyde condensate composition.

The polyepoxide compounds may be derived from the reaction of dichlorhydrins, epichlorhydrin or the like with other active hydrogen compounds such as mercaptans, phenols, etc. so long as there are no groups present in the final polyepoxides which interfere with the reaction of the epoxide groups or with the normal phenol formaldehyde condensations. The functional groups contained in the polyepoxide compounds used are primarily epoxide groups but the polyepoxides also contain hydroxyl groups. They are free from functional groups other than epoxy and hydroxy groups, such as basic or acid groups.

The simpler diepoxides may be produced and obtained of a high degree of purity by fractional distillation to separate them from by-products formed during their manufacture. Thus diepoxy butane, or diglycid ether can be separated by fractional distillation and give products of high purity, for example, around 95% or higher as determined by the method of epoxide analysis hereinafter described. When polyepoxides of higher molecular weight are produced which are difficult to isolate by fractional distillation they can, nevertheless, be advantageously used, after purification to remove objectionable impurities and catalyst and without separation of the diepoxide or polyepoxides from admixed by-products such as monoepoxides, etc.

Valuable polyepoxides for use in making the new compositions can thus be obtained by the reaction of epichlorhydrin on polyhydric alcohols containing three or more hydroxyl groups. Thus, a trihydric alcohol such as glycerol or trimethylol propane can be reacted with epichlorhydrin in the proportions of one mol of trihydric alcohol to three mols of epichlorhydrin, using a catalyst which will promote the reaction of the epoxide group of the epichlorhydrin with a hydroxyl group of the alcohol and with subsequent treatment of the reaction product to produce a polyepoxide. Such polyepoxides may contain, for example, approximately two epoxide groups per molecule even though three mols of epichlorhydrin are reacted with one mol of a trihydric alcohol. More complex or side reactions apparently take place which result in the production of products containing free hydroxyl groups or cyclic ring compounds or polymeric compounds which may be present in the resulting product. However, such polyepoxides can nevertheless advantageously be used in reactions with phenol aldehyde condensates as practiced in the present invention.

The procedure used in preparing these low molecular weight polyepoxides varies depending upon the starting material, that is whether the starting material is a polyhydric phenol, a polyhydric alcohol, etc. and it also depends upon whether the epoxide contributing reactant is a dichlorhydrin, an epichlorhydrin, or a polyepoxide of a different type than the one being prepared. On the other hand, when the simple polyepoxides are prepared from polyhydric alcohols, it is often found advantageous to first react the epoxide group of epichlorhydrin with the alcohol group present in the polyhydric alcohol in the presence of a catalyst such as boron trifluoride to produce an intermediate polychlorhydrin. This polychlorhydrin is then treated with some reagent which is capable of removing HCl to form epoxide groups.

The polyepoxide used may contain small or varying amounts of mixed monoepoxides. To the extent that monoepoxides are present they will react with the phenol aldehyde condensates to form hydroxy alkyl chains which in most cases contain primary alcohol groups which are reactive with epoxide groups, and may take part in crosslinking to the extent that there is a sufficient amount of polyepoxide present to react with them. In certain cases the presence of monoepoxy-hydroxy compounds may be desirable and advantageous, especially during the final hardening operation and at higher temperatures in the presence of catalysts under which conditions the hydroxyl groups readily react with the epoxide groups. There is also the possibility that some crosslinking may take place through reaction of these alcoholic hydroxyl groups with methylol groups present in the phenol aldehyde condensate to give ether linkages.

The reaction between the phenol aldehyde condensates and the polyepoxides is effected by heating the admixed materials, an elevated temperature usually being required. The use of a small amount of a catalyst such as caustic soda may also promote the reaction.

Many of the initial phenol formaldehyde reactants are soluble in water, including the so-called water soluble phenolic resins. Various polyepoxides are also soluble in water and aqueous solutions can be made containing the water soluble phenolic resin and the polyepoxide in regulated proportions for subsequent reaction, and such water solutions can be used e. g. for impregnating paper or fabrics or for forming coatings with subsequent heating to remove the water and to bring about the reaction between the phenolic resin and the polyepoxide.

Other phenol aldehyde condensates or resins are insoluble in water but are soluble in organic solvents. Solutions of such resins can be used together with added polyepoxides in regulated proportions and the solution then applied as a coating or for impregnation of fabrics or paper, etc., or for forming a film, with subsequent heating to remove the solvent and to cause reaction of the polyepoxide with the phenol aldehyde condensate. A small amount of a catalyst such as caustic soda may be used to promote the reaction. The polyepoxide can also be directly admixed with the phenol aldehyde condensate without the use of a solvent, and this is particularly advantageous in forming compositions which will react on heating and which will be converted to intermediate or final products without the need of eliminating a volatile solvent.

Thus, for film formation, it is desirable to have a varnish which may be applied in the form of thin films without the use of a solvent, and in many cases, without the use of a plasticizer. In such cases a phenol aldehyde condensate is advantageously used which will dissolve in the polyepoxide to give a liquid composition which is of suitable viscosity for application as a varnish. Such solutions are valuable for the impregnation of wood or the lamination of wood, or the impregnation of fabrics, etc. They are also desirable for use in molding operations where the presence of a solvent is undesirable.

For the preparation of such liquid compositions phenol aldehyde condensates may be used which are essentially phenol alcohols or alcololol phenols which have not been condensed to any appreciable extent to give polymers. For various other applications viscous or even solid compositions are desirable, and in making such compositions the partially polymerized or the more or less completely polymerized phenol condensates are advantageously used. In the case of condensates which would convert to infusible insoluble products, the condensate should be used at an intermediate stage; while condensates which polymerize to a final fusible product can be used in such state of polymerization.

The phenol aldehyde condensate can thus be used in different stages of conversion for admixing with the polyepoxides; and products of varying characteristics can be made by the use of condensates of different stages of conversion, depending upon the application to be made of the final product.

Thus, it is sometimes desirable to use a powdered solid fusible material which is capable of becoming infusible on further heating together with a liquid resinous material which is likewise capable of conversion into an infusible material on further heating with or without a catalyst. For such purposes it is possible to use as the powdered solid resin a phenol aldehyde condensate which has been condensed to a solid resin which can be powdered and to use as the liquid resinous constituent a liquid polyepoxide which when heated with the phenol aldehyde condensate will give a final infusible product. Such a composition can advantageously be used as a molding resin composition in the manufacture of grinding wheels or as a heat converting resin in the manufacture of a brake lining. When a mixture of powdered phenol formaldehyde resin and liquid polyepoxide are used in proper proportions and heated in conjunction with inert material such as asbestos, abrasives, etc., a hard, tough, infusible bonded product is produced.

It is known that many, if not most, phenol formaldehyde condensates or resins, when polymerized to infusible products, become brittle. Among the exceptions are the phenol formaldehyde condensates prepared from phenols which contain nuclear substituted alkyl chains of considerable length. Examples of the latter type of phenol aldehyde condensates are formaldehyde reaction products with butyl and amyl phenols. Usually the flexible type of phenol aldehyde condensates such as those prepared from phenols containing long alkyl chains in the nucleus are of a non-converting type such that the products remain permanently fusible even when heated to high temperatures in the presence of a catalyst.

The present invention enables such phenol aldehyde condensates which would normally give brittle conversion products or which would require a high percentage of plasticizer to give products with suitable flexibility to be converted by reaction with polyepoxides into conversion products which are tough, hard and flexible, without the use of plasticizers. The reaction of the polyepoxides with the intermediate resin and the reactions which take place during the subsequent hardening to form the final product result in a product free from objectionable brittleness.

The present invention also makes possible the production of infusible flexible products from phenol aldehyde condensates of the type which are permanently fusible, such as those derived from the reaction of long chain alkyl substituted phenols with formaldehyde. When such condensates are reacted with polyepoxides in the presence of a catalyst, the reaction of the polyepoxide and the phenol aldehyde condensate results in the production of infusible flexible products.

It is one advantage of the present invention that it enables phenolic resins, including reaction products of both types above mentioned, to be converted into final products, by reaction with polyepoxides, which final products have suitable flexibility to form protective coating films without the use of a plasticizer.

While I do not desire to limit myself by any theoretical explanation of the exact nature of the reactions which take place between the polyepoxides and the phenol aldehyde condensates, it would appear that this reaction is primarily one of direct addition of an epoxide group to a phenolic group with the resulting formation of an ether linkage, although reaction may also take place between an epoxide group and alcoholic hydroxyl groups present in the resin. Even in phenol aldehyde condensates of a somewhat advanced stage of condensation, hydroxyl groups are apparently present in such form that they are capable of reacting with the polyepoxides. In the case of non-condensed products which are essentially, for example, polymethylol phenol, there is present a high percentage of both alcoholic hydroxyl groups and phenolic hydroxyl groups, in which case both of these types of hydroxyl groups may take part in crosslinking reactions with polyepoxides. It may be also that other condensations take place by interaction of the phenol aldehyde condensate with itself, and that the presence of the polyepoxides does not prevent such condensations to some extent. It may be, however, that such normal condensations of phenol aldehyde condensate are greatly reduced, if not completely eliminated, by the reaction between polyepoxide and the condensate. It seems probable, however, that the conversion to the final polymeric product by reaction between the polyepoxides and the phenol aldehyde condensates is accompanied by some normal phenol aldehyde condensation and that the simultaneous reaction of polyepoxides with alcoholic and phenolic hydroxyl groups and the normal condensation of phenol aldehyde condensates with themselves takes place to some extent simultaneously in forming the complex final products.

The reactivity of polyepoxides with phenol aldehyde condensates is somewhat dependent upon the type and structure of phenol aldehyde condensate used. It is usually advantageous to use a catalyst to complete the conversions; although, in many cases it is possible to produce insoluble, infusible products without the use of catalyst. Catalysts which have been found particularly advantageous are alkaline catalysts such as aliphatic amines, sodium and potassium hydroxides and alkali phenoxides.

The final conversions may be carried out with or without the use of solvents and with or without the use of plasticizers, depending upon the final results desired. In certain protective coating applications it is sometimes desirable to apply a product which is essentially a solid dissolved in a solvent in which case it undergoes a preliminary dry by mere solvent evaporation, and the dry film may then be converted to an infusible, insoluble product on further heat treatment. On the other hand, when the compositions and products of the present invention are used to make molded or impregnated articles it is usually desirable to use a product which contains no solvent and which is sufficiently liquid at the temperature to be used in the final conversion such that it can be used without a solvent.

The present invention obviates or greatly reduces the need of plasticizers for converting final brittle and fusible products to have acceptable flexibility. Such plasticizers contribute little to the strength of films or molded objects and may be leached out. By compounding fusible products with polyepoxides in proper proportion and causing them to react upon heating a final product can be produced which in general does not require the use of a plasticizer and is free from objectionable brittleness.

For many purposes the initial mixture of phenol aldehyde condensate and polyepoxide can be used as a liquid mixture or in solution and, after application, converted to the final product in a single operation.

For other purposes it is advantageous to carry out the reaction of the phenol aldehyde condensate and polyepoxide part way to an intermediate stage of reaction, such that it is capable of further reaction to form the final product; and to use the intermediate product e. g. in solution for making films or for coating or impregnation or by compounding the intermediate product with fillers, etc., to make molded products.

It will be understood that the compositions of the present invention may be blended with other film forming or molded object forming compositions. The new compositions may also be pigmented or otherwise ground with certain inert fillers as desired for special applications.

The degree of polymerization can in part be regulated by the proportions of phenol aldehyde condensate and polyepoxide used. Thus, when all of the phenolic hydroxyl groups have reacted with the polyepoxide groups and the epoxide is present as terminal epoxide groups, the reaction is complete so far as the phenol hydroxyl groups and epoxide is concerned. The preliminary reaction probably tends to be one primarily between the phenolic hydroxyl groups and epoxide groups although reaction between epoxide groups and alcoholic hydroxyl groups undoubtedly takes place to some extent even in the early stages of the reaction. During the final reaction of converting such intermediate reaction products containing free exopide groups to form infusible products, the reaction is probably one primarily between terminal epoxide groups and alcoholic hydroxyl groups. Such alcoholic hydroxyl groups are present as alcololol groups in the phenol aldehyde condensate and they are also liberated in the process of the reaction of an epoxide group with phenolic and alcoholic hydroxyl groups.

The present invention provides a wide range of reaction compositions and products including initial mixtures of phenol aldehyde condensates and polyepoxides, partial or intermediate reaction products of such initial mixtures and compositions containing such intermediate reaction products as well as final reaction products. Such compositions containing unreacted epoxide groups may be used in reactions with other active hydrogen coupling type compounds. Compositions of the present invention containing free hydroxyl groups may be further reacted with coupling reagents which react with such hydroxyl groups to give more complex products.

In general, the intermediate reaction products, unless too highly polymerized, are soluble in solvents of the lacquer type such as ketone and ester solvents. Certain of the resinous reaction products of lower melting point and lower degree of polymerization are soluble in hydrocarbon solvents, particularly the aromatic type. Many of the new compositions, in particular mixtures of the polyepoxides with methylol phenols, are water soluble.

In addition to having very outstanding physical properties such as toughness and flexibility, the final conversion products derived from the new compositions have very outstanding chemical properties. Such products are highly resistant to oxidation, water, alkali, acids, solvents, etc.

Films and objects made from the new compositions are also relatively free from yellowing, apparently due to the fact that little or no aliphatic double bonds are present, and also due to fact that the phenolic hydroxyl groups which are usually considered to give yellowing in phenol aldehyde condensates have been converted to ether groups through reaction with epoxide groups. The fact that these phenolic hydroxyl groups have been converted to ether groups removes the possibility of a shift of the phenol groups into a ketone form which is usually credited with the formation of color in the normal phenol formaldehyde type of product.

The invention will be further illustrated by the following specific examples but it will be understood that the invention is not limited thereto.

The first three examples do not relate to the new compositions but rather to the production of polyepoxides suitable for use in making the new compositions.

*Example I*

In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heating the filtrate to 250° C. at 20 mm. pressure to give 261 parts of a pale yellow product.

This product can be distilled at temperatures above 200° C. at 2 mm. pressure provided it is sufficiently freed from impurities, but unless care is taken it is liable to undergo a violent exothermic reaction. It is not, however, necessary to purify this product by distillation since such by-products as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N. sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

Example II

By a procedure similar to that described in Example I, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples I and II can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

Example III

Similarly, a polyepoxide was prepared by treating a mixture of 2 mols of ethylene glycol and 7 mols of pure pentaerythritol with 28 mols of epichlorhydrin in the presence of boron trifluoride followed by treatment with sodium aluminate to give a product which had an epoxide equivalent of 174. This product had an average molecular weight of 392 which gives an average of 2.25 epoxide groups per molecule.

Example IV

A trihydric phenol was prepared by the condensation of a pure dimethylol p-cresol with a large excess of p-cresol in the presence of concentrated hydrochloric acid and removing the excess unreacted p-cresol after the reaction was complete by vacuum distillation.

An equal weight of this crude trihydric phenol and diglycid ether was heated with 1% by weight of sodium hydroxide for 1 hour at 150° C. to give an infusible, tough product.

Such products are extremely valuable as molding materials for binding various inert materials into molded objects.

Example V

A water soluble phenol aldehyde condensate was prepared by heating a mixture of 278 parts of formalin (40% formaldehyde), 188 parts of phenol and 3.2 parts of sodium hydroxide for 45 minutes at refluxing temperature. This product was dissolved in sufficient water to give 61% solids.

Twenty parts (based on resin solids) of this phenol formaldehyde condensate was blended with 20 parts of the product of Example I and to the resultant mixture was added 1.6 parts of sodium phenoxide. The resulting thin liquid when spread in thin films of .003 inch thickness and baked for 30 minutes at 150° C. gave an infusible, flexible film. Such films are extremely resistant to alkali, standing even boiling 50% caustic solution.

Similar results were obtained when 20 parts (based on resin solids) of the above phenol formaldehyde condensate was treated with 10 parts of the product of Example II with the addition of 1.6 parts of sodium phenoxide.

Example VI

A water insoluble phenol formaldehyde condensate was prepared by refluxing 94 parts of phenol with 203 parts of formalin and 1.5 parts of potassium hydroxide for a period of 1 hour and 38 minutes. The water layer was removed by decantation and the resulting product was cut to 70% solids by the addition of absolute alcohol.

Twenty parts of this phenol formaldehyde condensate and 20 parts of the product of Example III were treated with 1 part of potassium hydroxide to give a liquid varnish which when spread in thin films and baked for 30 minutes at 175° C. gave a flexible film similar to those described in Example V.

The phenol aldehyde condensates used in Examples V and VI are examples of heat converting type products; however, films or molded objects prepared from such products without the use of a high percentage of plasticizer are extremely brittle and of no use for protective coating films or molded objects without such plasticizers.

*Example VII*

This example illustrates the use of a permanently fusible phenol aldehyde condensate which, when treated with polyepoxides, gave infusible, insoluble products.

A mixture of 300 parts of p-tertiary butyl phenol, 320 parts of formalin and 6 parts of sodium hydroxide was refluxed for one hour. The water layer was removed by decantation and the product was finally dried by heating to a temperature of 110° C.

To 100 parts of this product which is essentially a non-condensed methylol phenol product, was added 100 parts of the product of Example III and 1 part of potassium hydroxide to give a thin liquid suitable for use as a varnish without further dilution. Thin films of this product convert to insoluble infusible products when heated for 15 minutes at 200° C.

100 parts of the above phenol aldehyde condensate, which had been heated to 110° C., was heated for 2 hours at 160° C. to give a brittle, permanently fusible resin. To this product was added 100 parts of diglycid ether and 2 parts of sodium hydroxide and the resulting mixture was heated in a molding form for 1 hour at 150° C. to give a tough, infusible object.

*Example VIII*

This example illustrates the use of a phenol formaldehyde condensate prepared from a dihydric phenol.

A mixture of 456 parts of bis phenol, 400 parts of formalin and .6 part of sodium hydroxide were refluxed for 2 hours. As much water as possible was removed by decantation. To this water containing product was added 300 parts of butyl alcohol and the resulting mixture was heated with distillation until no more water was coming over in the distillate. The percent solids on this butanol solution was determined to be 75%.

To 100 parts of this phenol aldehyde condensate (based on resin solids) was added 75 parts of the product of Example I and 1 part of potassium hydroxide to give a liquid which was of suitable viscosity for use as a varnish in protective coatings. Thin films of this varnish when baked for 30 minutes at 125° C. give hard, insoluble films.

This liquid product is also advantageously used for many other purposes such as impregnation of fabrics, wood, lamination of materials, etc.

*Example IX*

A phenol aldehyde condensate was prepared by refluxing a mixture of 150 parts of a cresylic acid fraction, boiling between 210 and 225° C., 120 parts of formalin and .2 part of sodium hydroxide for 2 hours. The water layer was removed by decantation to give a viscous, syrupy liquid product.

To 100 parts of this phenol aldehyde condensate was added 50 parts of diglycid ether and 1 part of sodium hydroxide, giving a liquid material of suitable viscosity for use in the application of varnish films or for impregnation of various fibers and porous materials. This product converts to an insoluble product when heated for 30 minutes at 150° C.

In the above examples the proportions of polyepoxide to phenol aldehyde condensate vary from a large excess of epoxide to phenolic hydroxyl of the phenol aldehyde condensate, as in Example IV, where the ratio of epoxide groups of the polyepoxide to phenolic hydroxyls of the phenol aldehyde condensate is about 1.8 to 1, to less than the equivalent amount of polyepoxide as in Example VIII, where the ratio of phenolic hydroxyls of the phenol aldehyde condensate to epoxide groups of the polyepoxide is about 1.4 to 1. Approximately equal proportions of epoxide and phenolic hydroxyl groups of the phenol aldehyde condensate and polyepoxide are illustrated in Example V.

Thus in Example IV the trihydric phenol $C_6H_3(OH,CH_3)-CH_2-C_6H_2(OH,CH_3)-$
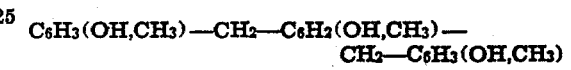
$CH_2-C_6H_3(OH,CH_3)$ of molecular weight 348 and with 3 phenolic hydroxyl groups has an equivalent weight per phenolic hydroxyl group of 116. Diglycid ether of molecular weight 130 and 2 epoxide groups has an equivalent weight per epoxide group of 65. Equal weights of the trihydric phenol and diglycid ether would represent for each part of trihydric phenol of 116 equivalent weight 116 ÷ 65 or approximately 1.8 equivalent weights of epoxide or a ratio of epoxide to phenolic hydroxyl of approximately 1.8 to 1. In Example V the phenol aldehyde condensate from 188 parts of phenol and 111 parts of formaldehyde (40% of 278) represents a weight of 299 and with two phenolic hydroxyls an equivalent weight to hydroxyl of 148.5. The polyepoxide of Example I has an equivalent weight of 149 so that using equal weights of the phenol aldehyde condensate and of the polyepoxide give approximately the equivalent ratios of epoxide to phenolic hydroxyl. In Example VIII 456 parts (2 mols) of the phenol with 160 parts (about 5.33 mols) of formaldehyde (400 parts of 40% formaldehyde solution), less 2 mols of water, gives a weight of condensate of about 580 with 4 phenolic hydroxyl groups or an equivalent weight of 145 per phenolic hydroxyl group. 100 parts of the condensate represents 100÷145, or 0.7 equivalents of phenolic hydroxyl. 75 parts of polyepoxide of Example I with equivalent weight per epoxide group of 149 represents 75÷149, or 0.5 equivalents of epoxide. The ratio of phenolic hydroxyl to epoxide group is 0.7:0.50, or approximately 1.4:1.

In the above examples the weights of liquid polyepoxide used and of the phenol aldehyde condensates vary from approximately equal proportions to an amount of phenol aldehyde condensates approximately twice the weight of the polyepoxide, as in Example IX.

It will thus be seen that the present invention provides resinous and plastic compositions and products in which phenol aldehyde condensates are admixed with polyepoxides for forming initial compositions capable of conversion into intermediate or into final reaction or polymerization products.

It will also be seen that the initial composition of polyepoxide and phenol aldehyde condensate may be used directly in making liquid coating compositions or in making molded articles, etc. with subsequent conversion by heating into the final reaction product.

It will further be seen that intermediate reaction products can be produced which are soluble and fusible and which are capable of further reaction to form the final infusible products.

The new compositions are capable of admixture with various other resins in forming the final molding mixtures and can also be used for compounding with fillers in making molded articles or for impregnating paper, fabric, wood, etc. in making impregnated or coated articles.

It will also be seen that the reaction between the polyepoxide and the phenol aldehyde condensate, which is mainly one of direct reaction by addition of epoxide to hydroxyl groups, does not give off any byproducts but results in joining together all the reactants through ether linkages, with the polyepoxides capable of acting as cross-linking reactants for the phenol aldehyde condensate.

The final infusible reaction and polymerization products made with the new compositions have a remarkable combination of desirable properties, including resistance to water, solvents, alkalies, and acids, toughness combined with hardness, flexibility at low temperatures, resistance to chemicals, wettability to most pigments, low viscosity at high solids content of solutions, and hardening of thick films through chemical reactions within the film itself.

I claim:

1. The method of producing compositions and products which comprises reacting, in the presence of a substantial amount of an alkaline catalyst substantial proportions of phenol aldehyde condensates containing reactive hydroxyl groups and liquid polyepoxides free from functional groups other than epoxy and hydroxyl groups, the proportions of phenol aldehyde condensate and polyepoxide being such that the ratios of epoxide groups of the polyepoxide to phenolic hydroxyls of the phenol aldehyde condensate are between about 1.8 to 1 and 1 to 1.4.

2. A composition containing in substantial proportions a reactive phenol aldehyde condensate containing phenolic and methylol groups and a liquid polyepoxide free from functional groups other than epoxy and hydroxy groups, the proportions of epoxy groups of the polyepoxide and of phenolic hydroxyl groups of the phenol aldehyde condensate being within the range of about 1.8 to 1 and 1 to 1.4.

3. A composition containing in substantial proportions a reactive phenol aldehyde condensate containing phenolic and methylol groups and a liquid polyepoxide free from functional groups other than epoxy and hydroxy groups, the proportions of phenol aldehyde condensate to polyepoxide being from about equal proportions by weight to about twice as much phenol aldehyde condensate as polyepoxide.

4. A composition containing in substantial proportions a reactive phenol aldehyde condensate containing phenolic and methylol groups and a liquid polyepoxide free from functional groups other than epoxy and hydroxy groups, the proportions of epoxy groups of the polyepoxide and of the phenolic hydroxyl groups of the phenol aldehyde condensate being within the range of about 1.8 to 1 and 1 to 1.4, such composition also containing a substantial amount of an alkaline catalyst.

5. A composition containing in substantial proportions a reactive phenol aldehyde condensate containing phenolic and methylol groups and a liquid polyepoxide free from functional groups other than epoxy and hydroxy groups, the proportions of phenol aldehyde condensate to polyepoxide being from about equal proportions by weight to about twice as much phenol aldehyde condensate as polyepoxide, such composition also containing a substantial amount of an alkaline catalyst.

6. An intermediate reaction product resulting from the partial reaction of the composition of claim 2, containing direct addition-reaction products of the polyepoxide and the phenol aldehyde condensate.

7. Infusible articles and compositions containing infusible products of direct addition-reaction of the composition of claim 2.

SYLVAN OWEN GREENLEE.

REFERENCES CITED

The following references are of record in the file of this patent:

UNITED STATES PATENTS

| Number | Name | Date |
|---|---|---|
| 1,952,243 | Frick | Mar. 27, 1934 |
| 2,131,120 | Schlack | Sept. 27, 1938 |

FOREIGN PATENTS

| Number | Country | Date |
|---|---|---|
| 352,042 | Great Britain | July 3, 1931 |
| 576,177 | Germany | May 8, 1933 |